United States Patent [19]

Jacobellis et al.

[11] 3,947,003
[45] Mar. 30, 1976

[54] HYDROPNEUMATIC SPRING

[75] Inventors: Alphonse A. Jacobellis, Woodland Hills; Abduz Zahid, Los Angeles, both of Calif.

[73] Assignee: Greer Hydraulics, Inc., Los Angeles, Calif.

[22] Filed: Oct. 21, 1974

[21] Appl. No.: 516,469

[52] U.S. Cl............................................. 267/64 R
[51] Int. Cl.²............................................. F16F 5/00
[58] Field of Search........................ 267/64 R, 65 R

[56] References Cited
UNITED STATES PATENTS

| | | | |
|---|---|---|---|
| 2,850,276 | 9/1958 | Jackson............................ | 267/64 R |
| 3,819,166 | 6/1974 | Ellis et al. ....................... | 267/64 R |

Primary Examiner—James B. Marbert
Attorney, Agent, or Firm—Arthur B. Colvin

[57] ABSTRACT

This invention relates to a hydropneumatic spring device comprising an outer cylindrical casing and an inner cylindrical casing both having closure means at each end. The inner cylindrical casing is positioned in said outer casing and is transversely spaced therefrom to define an elongated annular chamber. A piston slidably mounted in said inner casing has a piston rod extending axially from one end thereof through an axial bore in one of said closure means. A resilient sleeve encompassing the inner casing is positioned in the annular chamber extending substantially the length thereof. The ends of the sleeve are retained in fixed position so that a variable volume gas chamber is defined between the outer casing and the sleeve and a variable volume liquid chamber is defined between the inner casing and the sleeve. The gas chamber is adapted to be charged with gas under pressure and the portion of the inner casing between the piston and the other closure means is adapted to be charged with liquid. A passageway is provided through the inner casing for flow of such liquid into the liquid chamber.

12 Claims, 1 Drawing Figure

U.S. Patent   March 30, 1976   3,947,003
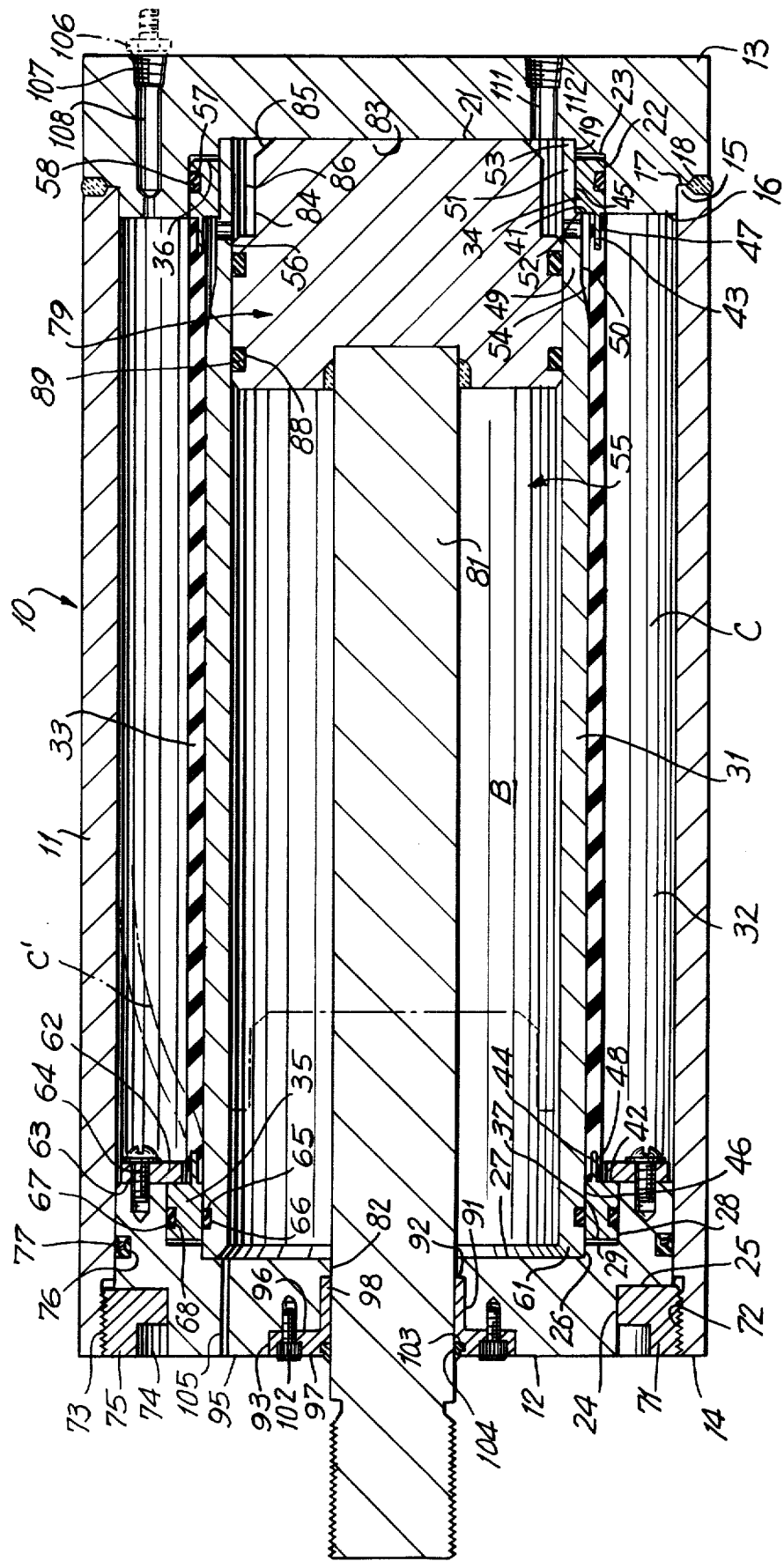

HYDROPNEUMATIC SPRING

As conducive to an understanding of the invention it is to be noted that where, for example, a platform is provided on which a heavy piece of equipment is to be mounted and to isolate the platform and the equipment thereon from seismic shocks and the like, which could cause damage, coil springs are used to support the platform, if the weight to be supported is relatively great, the springs would have to be correspondingly large in size with attendant great length and would occupy a great deal of space which often is not available.

In addition, if a number of coil springs are required to support the platform, it is difficult to provide springs which are identical in all respects and hence the platform may be improperly balanced.

It is accordingly among the objects of the invention to provide a hydropneumatic spring which is relatively simple in construction and compact in size yet capable of dampening severe shocks while supporting relatively great weights, and which hydropneumatic spring may, because of its configuration, be reproduced so that corresponding units are substantially identical.

According to the invention these objects are accomplished by the combination of elements hereunder described and more particularly recited in the claims.

In the accompanying drawing in which is shown one of various possible embodiments of the several features of the invention the single FIGURE is a longitudinal sectional view of the device.

Referring now to the drawing, the device 10 comprises a cylindrical outer casing 11 having closure plugs 12, 13 secured to the respective end 14 and 15 thereof.

More particularly, the end plug 13 is of reduced diameter at its inner end as at 16 defining an annular shoulder 17 against which the end 15 of casing 11 will abut when the reduced diameter portion 16 is inserted into the open end 15. The plug 13 is secured to the end 15 of the casing as by welding at 18.

The plug 13 has a cylindrical recess 19 forming an internal floor 21 and the recess 19 is of enlarged diameter at its inner end as at 22 defining an annular shoulder 23.

The plug 12 is of reduced diameter at its outer end as at 24 defining an annular shoulder 25. The plug 12 also has a cylindrical recess 26 forming an internal floor 27 and the recess 26 is of enlarged diameter at its inner end as at 28 defining an annular shoulder 29.

Positioned in outer casing 11 and coaxial therewith is an inner casing 31 said casings 11 and 31 being spaced to define an annular chamber 32.

Encompassing inner casing 31 and preferably snugly engaging the latter, and extending substantially the entire length thereof, is sleeve 33 of resilient deformable material such as natural or synthetic rubber having like characteristics.

To mount the resilient sleeve 33, mounting rings 34, 35 are provided, each substantially rectangular in cross-section. The rings 34, 35 are of outer diameter respectively substantially equal to that of the enlarged diameter portions 22, 28 of recesses 19 and 26 so that they may fit into such enlarged diameter portions with the outer end surfaces 36, 37 of the rings being in juxtaposition with shoulders 23, 29 respectively. The outer end surfaces 36, 37 of the rings 34, 35 are of thickness in cross-section substantially equal to the width of the associated shoulder 23, 29 and the rings are of length in cross-section just slightly less than the length of the enlarged diameter portions 22, 28.

The inner end surfaces 41, 42 of each of the rings 34, 35 has an annular flange 43, 44 formed integrally therewith and extending parallel to the axis of the associated ring, the flanges 43, 44 being outwardly spaced from the longitudinal plane of the inner periphery 45, 46 of the associated ring 34, 35. Thus each of the flanges 43, 44 is spaced between the inner and outer peripheries of the inner surfaces 41, 42 of rings 34, 35.

As is clearly shown, the ends 47, 48 of resilient sleeve 33 are secured to associated flanges 43, 44 preferably by being molded integrally therewith when the sleeve is initially molded.

As shown in the drawing, the end portion 49 of inner casing 31 has a first reduced outer diameter section 50 and a second reduced outer diameter section 51 of diameter substantially equal to that of recess 19, the reduced diameter portion 51 defining an annular shoulder 52 and extending to the end 53 of casing 31.

Thus when the inner casing 31 is inserted into the resilient sleeve 33 until the annular shoulder 52 abuts against the inner periphery of the inner end surface 41 of ring 34, the end 53 will abut against the floor 21 of recess 19.

By reason of reduction in the outer diameter of the inner casing 31 as at 50, an annular cavity 54 is provided between the outer surface 50 and the adjacent inner surface of resilient sleeve 33. To provide access between the interior or bore 55 of inner casing 31 and cavity 54, a plurality of circumferentially spaced bores or passageways 56 are provided through the wall of casing 31 adjacent annular shoulder 52. More particularly, the passageways 56 are transversely aligned with the annular flange 43 for the purpose hereinafter set forth.

In order to provide a seal between the ring 34 and the surface 22 of plug 13, the cylindrical periphery of ring 34 has an annular groove 57 in which an O-ring 58 is positioned.

As shown in the drawing, the end 61 of inner casing 31 abuts against the floor 27 of recess 26 and the outer diameter of end 61 is substantially equal to the diameter of recess 26 in plug 12.

The ring 35 is securely retained in position by means of an annular retaining member or washer 62 which is secured to the inner surface 63 of plug 12 by screws 64.

A seal is provided between the inner periphery 46 of ring 35 and the outer surface of casing 31 by means of an O-ring 65 positioned in an annular groove 66 in casing 31. A seal is also provided between the surface 28 and the ring 35 by an O-ring 67 positioned in an annular groove 68 in ring 35.

The plug 12 is retained in the open end of casing 11 by a retaining ring 71 externally threaded as at 72 and screwed into the correspondingly internally threaded end 14 as at 73. Preferably the retaining ring 71 has a plurality of bores 74 on its outer surface 75 adapted to receive a spanner wrench (not shown).

To provide a seal between the casing 11 and the outer periphery of plug 12, the latter has an annular groove 76 in which an O-ring 77 is positioned.

Slidably mounted in the bore 55 of inner casing 31 is a piston 79 having a piston rod 81 extending axially therefrom through an axial opening 82 in plug 12. The piston is of reduced diameter adjacent its outer end 83 as at 84 and the periphery of said outer end 83 is beveled as at 85.

As is clearly shown, the reduced diameter portion 84 is of length such that when the end 83 of the piston 79 abuts against the floor 21 of recess 19 in plug 13, the passageways 56 will be exposed to provide communication between annular cavity 54 and the annular bore cavity 86 defined between reduced diameter portion 84 and the adjacent wall of casing 31.

In order to provide a seal between the piston 79 and the casing 31, the piston 79 is provided with spaced annular grooves 88 in each of which a sealing member such as an O-ring 89 is mounted.

The axial bore 82 in plug 12 has a first enlarged diameter portion 91 defining an annular shoulder 92 and a second enlarged diameter portion 93 defining an annular recess exposed on the outer surface 95 of the plug 12, said recess having a floor 96.

Positioned in recess 93 is a retaining ring 97 having a cylindrical sleeve portion 98 extending axially therefrom and positioned in enlarged diameter portion 91 encompassing piston rod 81.

The retaining ring 97 is secured in position by means of screws 102 and the inner periphery of the retaining ring 97 has an annular recess 103 in which an annular scraper ring 104 is positioned.

The diameter of piston rod 81 is such that it extends through the retaining ring 97 with slight clearance to permit passage of air and the scraper ring 104 will clean off the rod 81, but also permit passage of air. In addition, a bore 105 is provided through plug 12 to vent the bore 55 of casing 31.

With the construction above described, an elongated annular gas chamber C is provided between the inner surface of outer casing 11 and the resilient sleeve 33. This chamber is charged with gas under pressure through a gas valve 106 mounted in the port 107 defined at the outer end of a passageway 108 extending through plug 13 and leading into gas chamber C.

The chamber defined between the end 83 of piston 79 and floor 21 of recess 19 in plug 13 as well as the annular bore cavity 86 may be charged with a fluid such as oil under pressure through passageway 111 extending through plug 13, the passageway defining a port 112 at its outer end, and has a valve (not shown) to close such port.

The device is designed to absorb shock directed axially of the piston rod which tends to force the latter inwardly.

For this purpose, gas under pressure is forced through valve 106 to charge gas chamber C to a predetermined pre-charge pressure.

Since the resilient sleeve 33 initially substantially engages the inner casing 31, it will not be displaced inwardly except for the portion thereof aligned with annular cavity 54. However, since the end 47 of the sleeve 33 is bonded to annular flange 43, the bores 56 aligned therewith will remain open and no portion of the sleeve 33 can extrude into such bores.

Thereupon oil under pressure is forced into the oil port 112 into annular cavity 86, which causes the piston 79 to move to the left, as illustrated in broken lines, until the piston abuts against floor 27 of plug 12.

Such movement of the piston 79 as well as the piston rod 81 is permitted by reason of the venting of the air in the portion of bore 55 to the left of the piston 79, through the clearance between the piston rod 81 and retaining ring 97 as well as through the vent bore 105.

The device thus described with the piston rod 81 fully extended is thus equivalent to a fully extended coil spring which has no compressive force applied thereto.

Clearly the "spring force" provided by the device 10 is a function of the size of the gas chamber and the pressure of the gas precharged therein.

By reason of the fact that the gas chamber C is "wrapped" around the inner casing 31 in which the piston 79 and piston rod 81 are positioned, the device may be extremely compact and relatively short in length as compared to a coil spring designed to provide equivalent force.

In a typical example of the use of the device 10 one or more devices 10 may be positioned vertically with the extended piston rod or rods supporting a platform.

In the event that any downward force or shock is exerted against the platform, it would tend to move the piston rod downwardly (or to the right referring to the drawing). As a result the oil in the portion B of bore 55 to the right of the piston 79 (referring to the broken lines) will be displaced to the right and forced through the bores 56 into annular cavity 54. This will cause the resilient sleeve 33 to move outwardly as shown in broken lines at C' in the drawing. Consequently the gas in chamber C will be further compressed, restraining rapid movement of the piston 79 and the piston rod 81 and hence dampening the shock.

By reason of the molding of the ends 47, 48 of resilient sleeve 33 to flanges 43, 44 and the provision of sealing members 58, 65, 67 and weld 18, the gas in chamber C is completely isolated from the oil in bore 55 and particularly from the seal rings 89 for the piston 79 and leakage of gas is substantially precluded so that the device may remain charged with gas under pressure for a relatively long period without substantially no loss of charge.

It is important to note that the piston seals 89 are completely isolated from the gas under pressure. This is important as if the seals were exposed to the gas, the gas would dry the surface of the cylinder and hence the seals would not be lubricated and would quickly dry out thereby losing their sealing effect so that leakage would occur with resultant loss of loading forces.

It is apparent that by merely bleeding gas from port 107 through valve 106, or charging gas under pressure through valve 106, the operating characteristics of the device may readily be adjusted.

Having thus described our invention, what we claim as new and desire to secure by letters patent of the United States is:

1. A device of the character described comprising an outer cylindrical casing having a closure member at each end thereof, one of said closure members having an axial bore therethrough, an inner cylindrical casing positioned in said outer casing coaxial therewith and transversely spaced therefrom to define an elongated annular chamber, a piston slidably mounted in said inner casing, said piston having a piston rod extending axially therefrom through said axial bore in said closure member, a resilient deformable and expandible sleeve positioned in said annular chamber extending substantially the length thereof and encompassing said inner casing, means securely retaining the ends of said resilient sleeve in fixed position, to define a variable volume gas chamber between the outer casing and said resilient sleeve and a variable volume liquid chamber between the inner casing and said resilient sleeve, means to charge said gas chamber with gas under pressure, means to charge the portion of said inner casing between the other closure member and the piston with liquid, and means providing communication between the liquid chamber and the portion of said inner casing to be charged with liquid and including at least one passageway through said inner casing, at least a portion of said means securely retaining the ends of said resilient sleeve in fixed position precluding blockage of said at least one passageway of said communication means.

2. The combination set forth in claim 1 in which the piston is of reduced diameter at the end portion thereof opposed to said other closure member defining an annular cavity with respect to the adjacent surface of said inner casing, one end of said cavity defining an annular shoulder and the other end being open.

3. The combination set forth in claim 2 in which the said liquid charging means comprises a passageway extending through said other closure member, the outer end of said passageway defining a filling port and the inner end of said passageway leading into the inner casing adjacent the inner surface thereof.

4. The combination set forth in claim 2 in which the side wall of said piston between said annular shoulder and the inner end of the piston from which the piston rod extends has a pair of spaced parallel annular grooves and an O-ring is positioned in each of said grooves to define a seal with respect to the inner wall surface of said inner casing.

5. The combination set forth in claim 1 in which said liquid charging means comprises a passageway extending through said other closure member.

6. The combination set forth in claim 1 in which the piston is of reduced diameter at the end portion thereof opposed to said other closure member defining an annular cavity with respect to the adjacent surface of said inner casing, said piston being movable in said inner casing for abutment of the end thereof opposed to said other closure member against the inner surface of said other closure member, said communication means comprises a passageway extending through the wall of the inner casing and leading into said annular cavity when the end of the piston abuts against said other closure member.

7. The combination set forth in claim 1 in which each of said closure members comprises a plug secured to the respective ends of said outer casing, a pair of longitudinally spaced parallel mounting rings are provided coaxial with said inner casing and said resilient sleeve, said mounting rings encompassing said inner casing, means securing the ends of said resilient sleeve to an associated mounting ring and means retaining said mounting rings in fixed position with respect to said closure plugs.

8. The combination set forth in claim 7 in which each of said plugs has a cylindrical recess therein each defining a floor, the ends of said inner casing extending into an associated recess and abutting against the floor thereof, each recess having an enlarged diameter portion defining a further annular cavity with respect to the inner casing, in each of which an associated mounting ring is positioned, an annular abutment integral with the end portions of the inner casing reacting against one of the mounting rings to retain the latter in its associated further annular cavity, and a retaining member secured to one of the plugs and reacting against the other mounting ring to retain the latter in its associated further annular cavity.

9. A device of the character described comprising an outer cylindrical casing having a closure member at each end thereof, one of said closure members having an axial bore therethrough, an inner cylindrical casing positioned in said outer casing coaxial therewith and transversely spaced therefrom to define an elongated annular chamber, a piston slidably mounted in said inner casing, said piston having a piston rod extending axially therefrom through said axial bore in said closure member, said piston being of reduced diameter at the end portion thereof opposed to said other closure member defining an annular cavity with respect to the adjacent surface of said inner casing, one end of said cavity defining an annular shoulder and the other end being open, said piston being movable in said inner casing for abutment of the end thereof opposed to said other closure member against the inner surface of said other closure member, a resilient deformable and expandible sleeve positioned in said annular chamber extending substantially the length thereof and encompassing said inner casing, means securely retaining the ends of said resilient sleeve in fixed position, to define a variable volume gas chamber between the outer casing and said resilient sleeve and a variable volume liquid chamber between the inner casing and said resilient sleeve, means to charge said gas chamber with gas under pressure, a passageway extending through said other closure member leading into the open end of said annular cavity, the outer end of said passageway defining a filling port for charging the portion of said inner casing between the other closure member and the piston with liquid, and an additional passageway extending through the wall of the inner casing near the end thereof in juxtaposition to said other closure member and also leading into said annular cavity in said piston when the end of the piston abuts against said other closure member to provide constant communication between the liquid chamber and the portion of said inner casing to be charged with liquid.

10. The combination set forth in claim 9 in which the inner casing at the end portion thereof adjacent said other closure member is of reduced outer diameter, said resilient sleeve is in juxtaposition to said inner casing along substantially its entire length and is spaced from the reduced diameter portion thereof to define an additional annular cavity with respect thereto, said additional annular cavity forming part of said liquid chamber, said additional passageway in said inner casing extending through the portion of the wall of said inner casing aligned with said additional annular cavity between the inner casing and the resilient sleeve.

11. The combination set forth in claim 9 in which a plurality of circumferentially spaced radial bores extend through said inner casing to define said additional passageway.

12. The combination set forth in claim 10 in which each of said closure members comprises a plug secured to the respective ends of the outer casing, a pair of longitudinally spaced parallel mounting rings are provided coaxial with said inner casing and said resilient sleeve said mounting rings encompassing said inner casing, each of said mounting rings having an annular flange extending inwardly therefrom coaxially therewith, the ends of said resilient sleeve being bonded to an associated flange, means retaining said mounting rings in fixed position with respect to said closure plugs and a plurality of circumferentially spaced radial bores extend through said inner casing to define said additional passageway, the annular flange of the mounting ring, to which is secured the end of the resilient sleeve aligned with the reduced diameter portion of the inner casing, being aligned with said bores thereby preventing extrusion therethrough of the portion of the resilient sleeve transversely aligned with said bores.

* * * * *